(12) United States Patent
Huang

(10) Patent No.: US 6,552,993 B2
(45) Date of Patent: Apr. 22, 2003

(54) CLAMPING DEVICE FOR OPTICAL DISK DRIVER

(75) Inventor: Hui-Chu Huang, Taipei (TW)

(73) Assignee: Lite-On It Corporation, Taipei (TW)

( * ) Notice: Subject to any disclaimer, the term of this patent is extended or adjusted under 35 U.S.C. 154(b) by 156 days.

(21) Appl. No.: 09/818,662

(22) Filed: Mar. 28, 2001

(65) Prior Publication Data

US 2002/0141326 A1 Oct. 3, 2002

(51) Int. Cl.[7] .................................................. G11B 23/00
(52) U.S. Cl. ........................................................ 369/270
(58) Field of Search ................................. 369/270, 271, 369/282

(56) References Cited

U.S. PATENT DOCUMENTS 6,292,456 B1 * 9/2001 Huang et al. ............... 369/270

* cited by examiner

Primary Examiner—Allen Cao
(74) Attorney, Agent, or Firm—Rosenberg, Klein & Lee

(57) ABSTRACT

A clamping device for optical disk driver comprises a base plate, an upper clamping body and a plurality of sliding stages. The base plate has a through hole receiving the upper clamping body. The sliding stages are arranged on the base plate and around the through hole. The base plate has a sliding block and a control rod at predetermined positions. The sliding stage has a Z shaped groove and the upper clamping body is rotated to clamp an optical disk.

7 Claims, 9 Drawing Sheets

CLAMPING DEVICE FOR OPTICAL DISK DRIVER

FIELD OF THE INVENTION

The present invention relates to a clamping device for optical disk driver, especially to a clamping device for optical disk driver, which has downward rotation movement to reduce occupied space.

BACKGROUND OF THE INVENTION

The optical disk drivers are widely used for computer to access video, audio and data stored on optical disks. The optical disk driver generally has a pick-up head with a specific distance to the optical disk to be accessed. Moreover, the optical disk driver generally has a disk tray to perform the loading and ejecting operation for the optical disk. Therefore, the optical disk driver requires a considerable space to perform above operations. Moreover, when the optical disk is loaded into the optical disk driver, the optical disk should be clamped to facilitate the operation of the pick up head. The clamping mechanism of the optical disk can be classified into downward clamping by an upper clamping means and upward clamping by a downward clamping means.

The clamping means of the optical disk driver generally comprises a permanent magnet, which has magnetic attraction force to a turntable on a spindle motor. FIG. 1 shows a perspective view of a prior art clamping means of the optical disk driver, which is a downward clamping means exerting an upward clamping force. The main body 1a of the optical disk driver has a supporting board (not shown) on topside thereof and the supporting board has a magnetic element (not shown). The clamping means of the optical disk driver has a turntable 121a with a metal plate (not shown) and the turntable 121a is mounted on a spindle motor 12a. The spindle motor 12a is mounted on a base plate 10a within the main body 1a of the optical disk driver and a pick up head 11a is also mounted on the base plate 10a. When the optical disk is loaded into the optical disk driver, the base plate 10a is moved up by a driving mechanism 13a such that the magnetic element of the supporting board is attracted by the metal plate of the turntable 121a. The optical disk is therefore clamped between the magnetic element of the supporting board and the metal plate of the turntable 121a. The pick up head 11a is linked with the base plate 10a. When the base plate 10a is moved upward, the pick up head 11a is also moved upward.

However, the above-mentioned base plate 10a has an upward movement to provide clamping force such that the base plate 10a occupies considerable space and the pick up head 11a is also moved with the base plate 10a.

SUMMARY OF THE INVENTION

It is the object of the present invention to provide a clamping device for optical disk driver with compact size, wherein the sliding stage thereof has a Z shaped groove and the upper clamping body is rotated to clamp an optical disk.

To achieve above object, the inventive clamping device for optical disk driver comprises a base plate, an upper clamping body and a plurality of sliding stages. The base plate has a through hole receiving the upper clamping body. The base plate has a sliding block and a control rod at predetermined positions. The upper clamping body is composed of a clamping rack, a supporting rack, and a clamping clinch assembled together. The clamping rack has a plurality of sliding recesses corresponding to the sliding pins. The upper clamping body is received within the through hole and the clamping rack is connected to the sliding block. The supporting rack has a plurality of rail pins on circumference thereof; the clamping clinch clamps an optical disk on a turntable of the optical disk driver. The sliding stages has rail corresponding to the rail pins and both ends of the rail have different height. The clamping rack is rotated and the rain pin is moved downward in the rail of the sliding stage to move downward the clamping clinch, thus clamping the optical disk on the turntable.

The various objects and advantages of the present invention will be more readily understood from the following detailed description when read in conjunction with the appended drawing, in which:

DETAILED DESCRIPTION OF THE INVENTION

Figures 2, 2A:
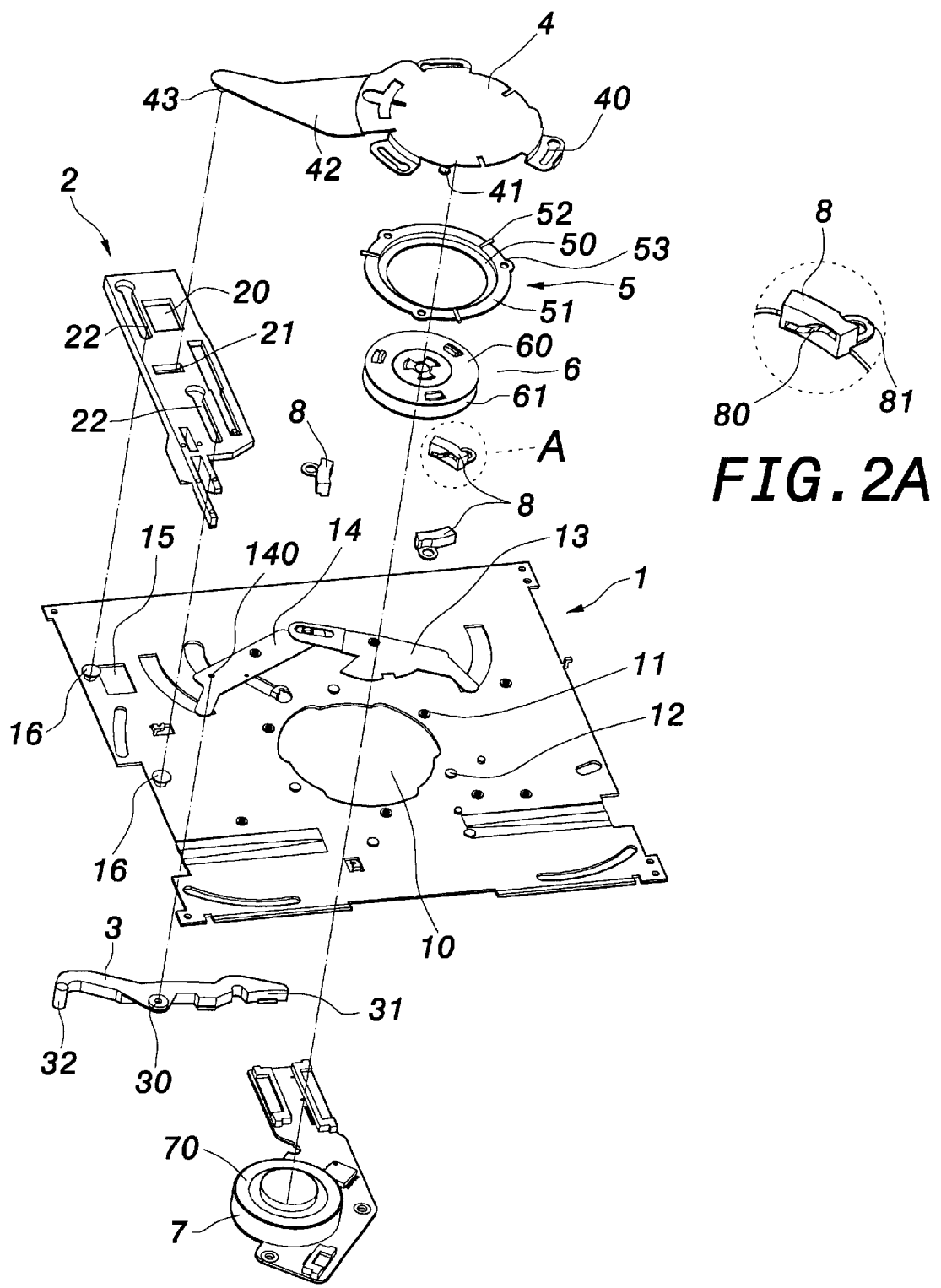
FIG. 2 shows the exploded view of the clamping device for optical disk driver of the present invention.
FIG. 2A is an enlarged view of part A in FIG. 2.

FIG. 2 shows the exploded view of the present invention. The clamping device for optical disk driver according to the present invention comprises a base plate 1, a sliding block 2, a control rod 3, a clamping rack 4, a supporting rack 5, a clamping clinch 6, a spindle motor 7 and a plurality of sliding stages 8 (with particularly reference to FIG. 2A).

The base plate 1 has a through hole 10 at center thereof and has a plurality of sliding holes 11 and sliding pins 12 thereon and near the edge of the through hole 10. The base plate 1 further has a left link rod 14 and a right link rod 13 linked to each other. The left link rod 14 has a positioning hole 140 for control rod 3. The base plate 1 further has a guiding hole 15 for control rod 3 and two guiding pins 16 for sliding block 2 and with predetermined separation.

The sliding block 2 has an aperture 20, a guiding groove 21 and two sliding grooves 22 corresponding to the two guiding pins 16.

The control rod 3 is a rod with a specific shape and has a clamping hole 30 at center thereof, which can also be functioned as pivot. One end of the control rod 3 is a driving arm 31 for optical disk and another end of the control rod 3 is a guiding pin 32 for control rod 3.

Figure 3:
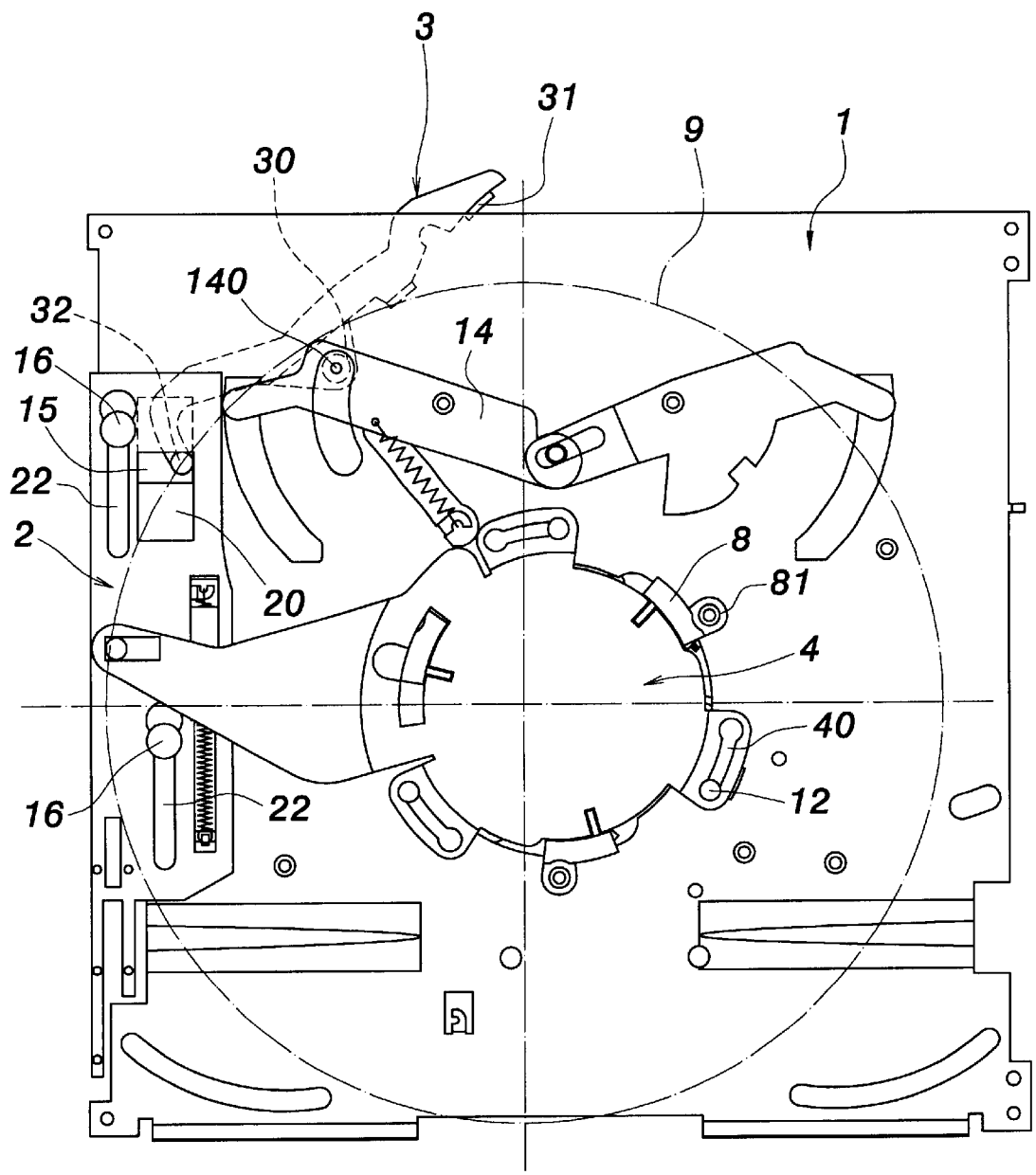
FIG. 3 is a top view of the clamping device of the present invention with clamped disk.
Figure 4:
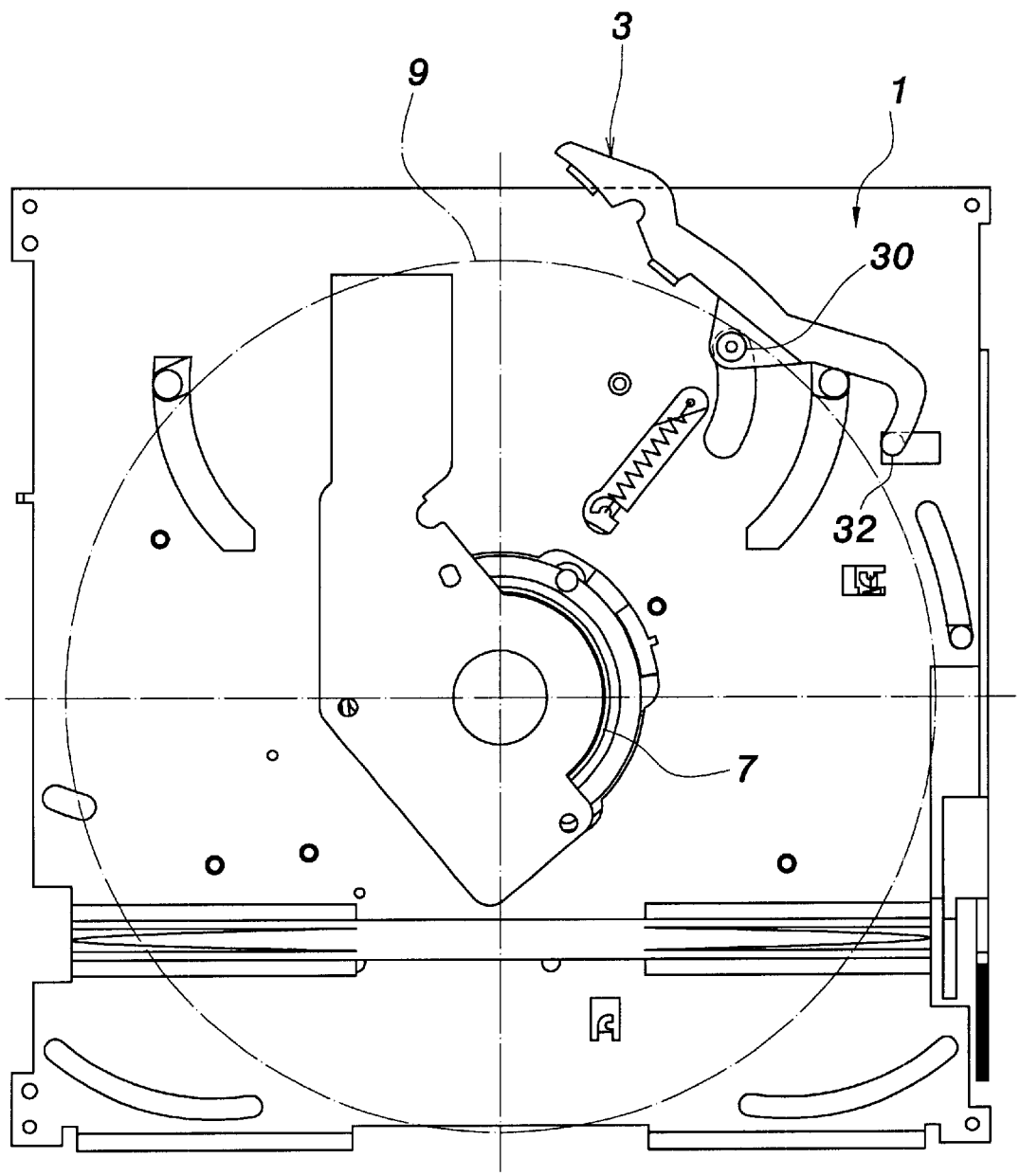
FIG. 4 is a bottom view of the clamping device of the present invention with clamped disk.

As shown in FIGS. 3 and 4, the control rod 3 is arranged below the base plate 1 and screws (not shown) are screwed through the clamping hole 30 and the positioning hole 140 on the left link rod 14 to fix the control rod 3 on the base plate 1. Moreover, the guiding pin 32 passes the guiding hole 15 for control rod 3 and passes the aperture 20 of the sliding block 2 such that the base plate 1, the sliding block 2, and the control rod 3 have linking relationship therebetween. Moreover, the sliding block 2 has linear sliding motion on the base plate 1 by the help of the sliding grooves 22 and the guiding pins 16.

When an optical disk 9 is loaded into the optical disk driver and placed below the base plate 1, the optical disk 9 pushes backward driving arm 31 and the control rod 3 is rotated with the clamping hole 30 as pivot such that the guiding pin 32 pushes forward the sliding block 2 and the sliding block 2 is slid forward.

Figure 5:
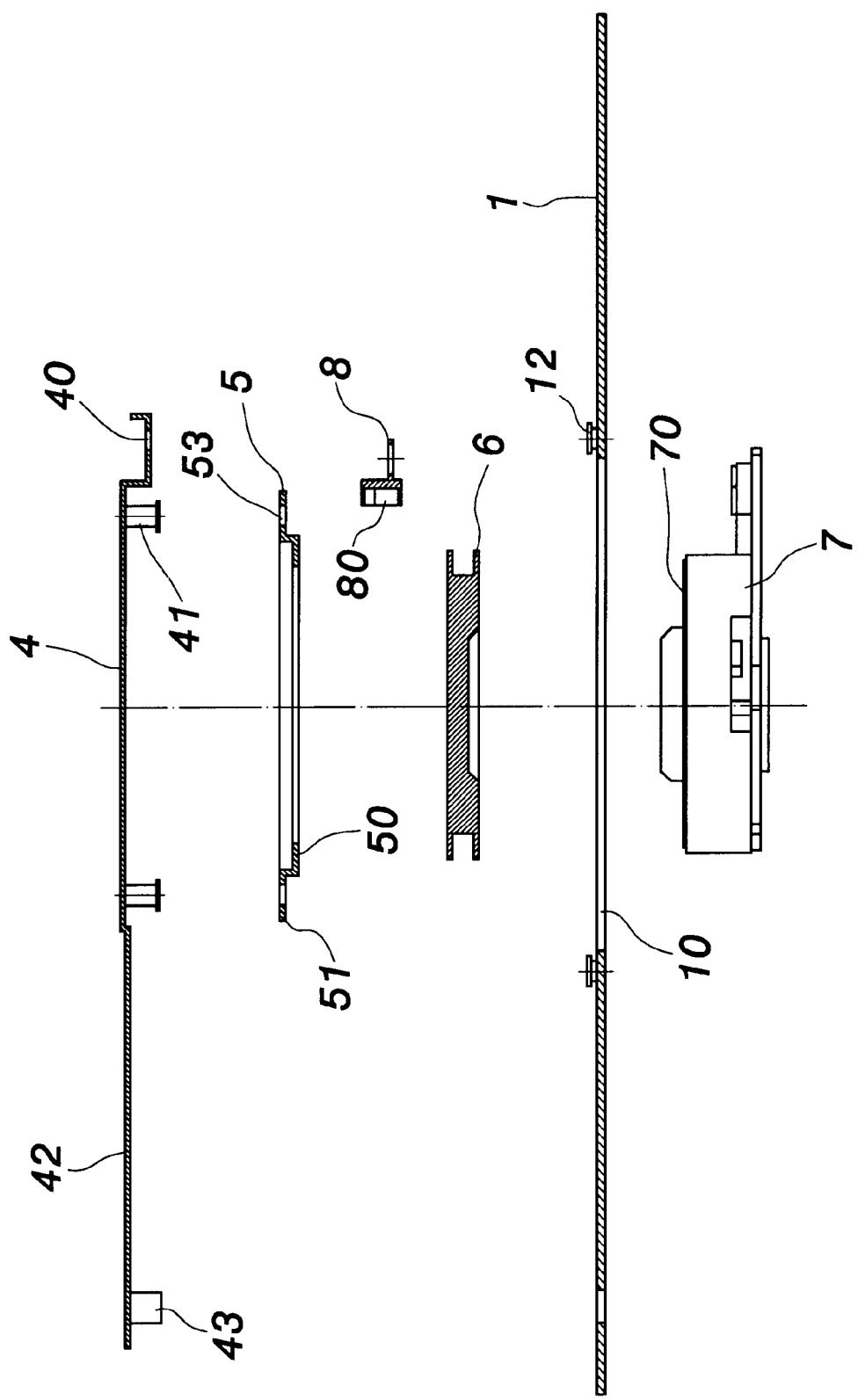
FIG. 5 is a sectional exploded view of the clamping device for optical disk driver of the present invention.

With reference now to FIGS. 2 and 5, the clamping rack 4 has a shape suitable to cover atop the through hole 10 at center of the base plate 1 and has a plurality of sliding recesses 40 corresponding to the sliding pins 12 on perimeter thereof. The clamping rack 4 has a supporting pin 41 between two sliding recesses 40. The clamping rack 4 has a rotation arm 42 extended therefrom. The rotation arm 42 has a guiding pin 43 for clamping rack 4 on bottom thereof.

The supporting rack 5 has an inner ring 50 and an outer ring 51 together forming a stair shape. The outer ring 51 has a plurality of rail pins 52 with equal separation on perimeter thereof and a guiding-pin hole 53 between two rail pins 52 and corresponding to the supporting pin 41.

The clamping clinch 6 has an upper surface 60 and a lower surface 61 with a predetermined separation therebetween. The bottom of the clamping clinch 6 is placed atop the turntable 70 of the spindle motor 7.

Figure 6:
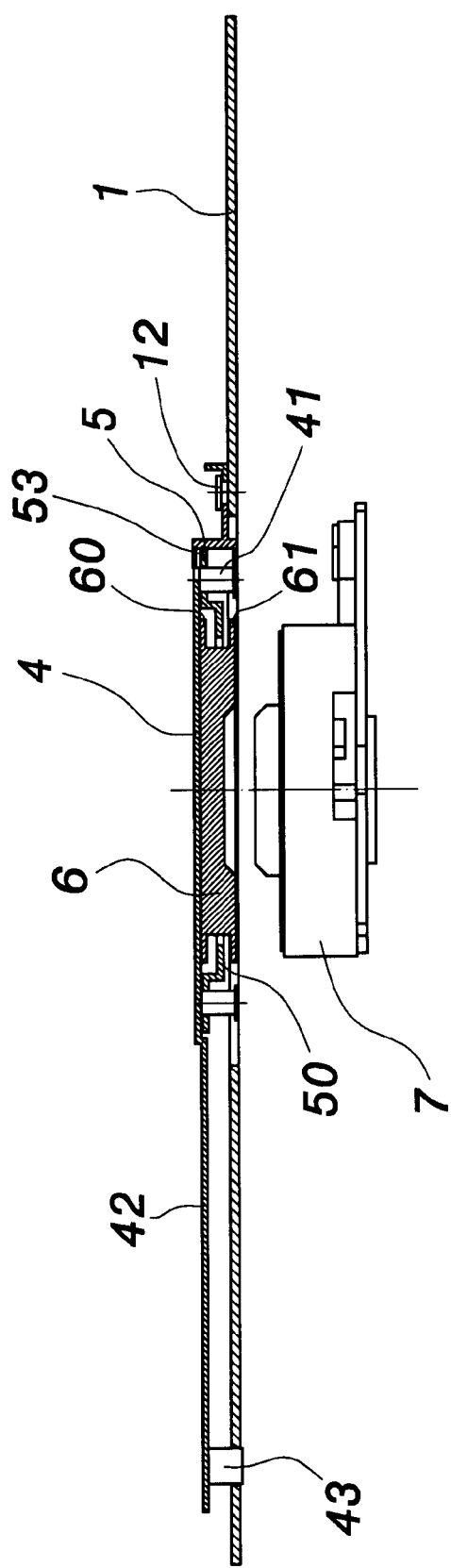
FIG. 6 is a section view of the clamping device of the present invention with clamped disk.
Figure 7:
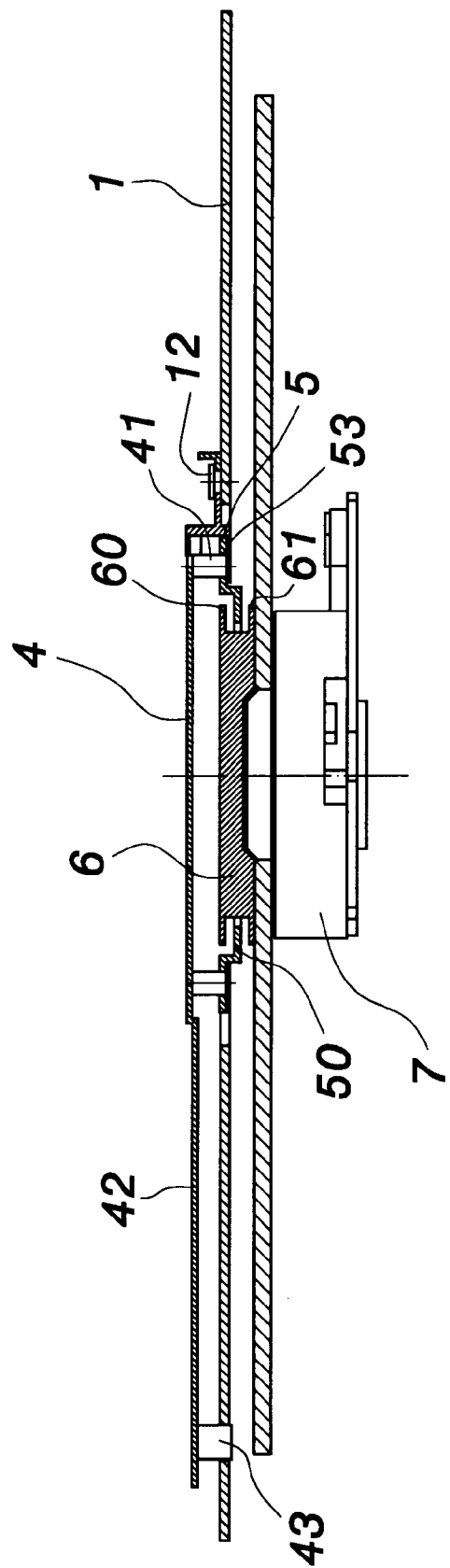
FIG. 7 is another section view of the clamping device of the present invention with clamped disk.

With reference to FIGS. 6 and 7, the inner ring 50 of the supporting rack 5 is located between the upper surface 60 and the lower surface 61 of the clamping clinch 6. When the supporting rack 5 is moved upward, the guiding-pin hole 53 is slid to a position atop the supporting pin 41 of the clamping rack 4. The upper surface 60 of the clamping clinch 6 is lifted to facilitate the loading and ejection of the optical disk 9. When the supporting rack 5 is moved downward, the guiding-pin hole 53 is slid to a position below the supporting pin 41 of the clamping rack 4. The guiding-pin hole 53 is laid against the lower surface 61 of the clamping clinch 6. The clamping clinch 6 is clamped downward to clamp the optical disk 9 on the turntable 70 of the spindle motor 7.

Figure 8:
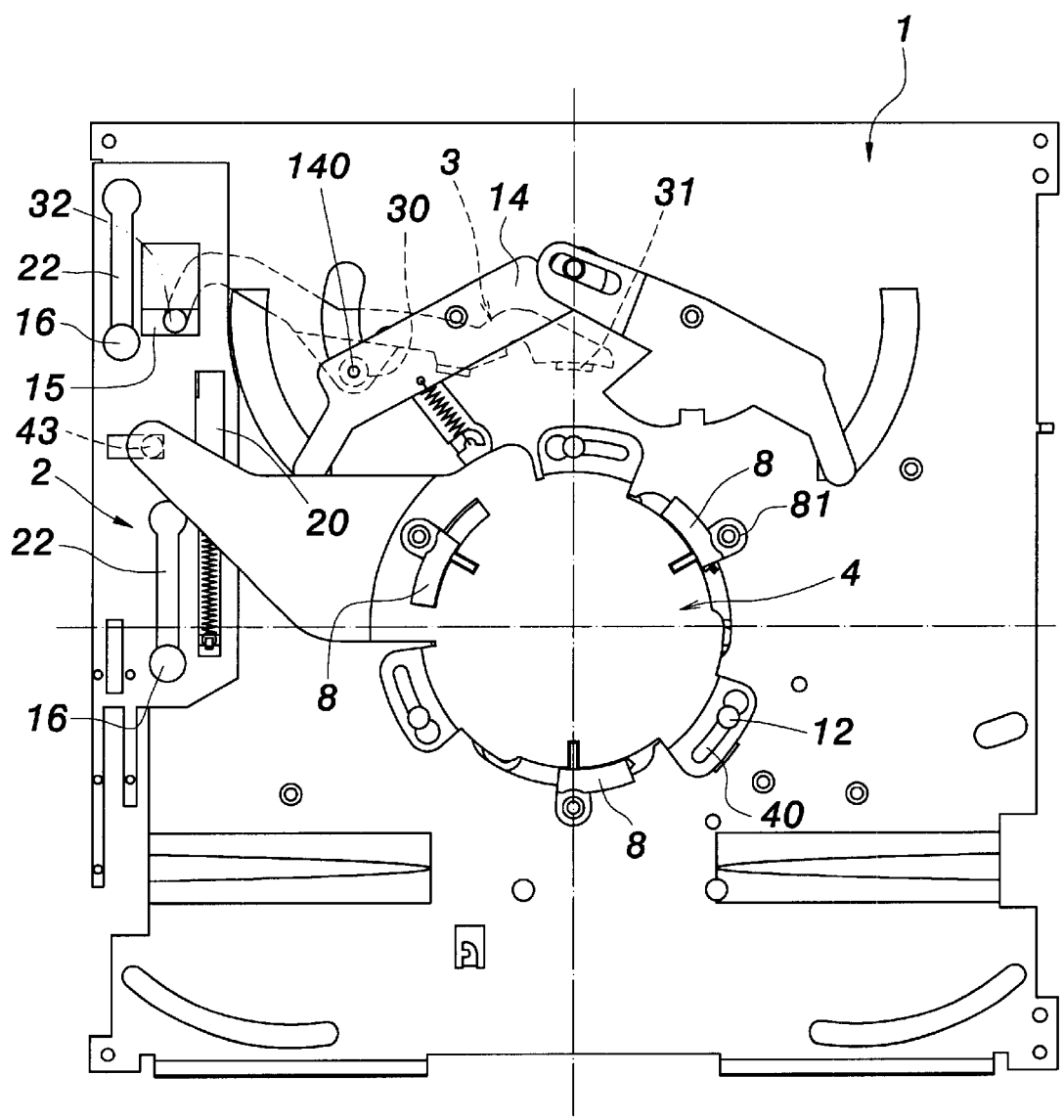
FIG. 8 is a top view of the clamping device of the present invention without clamped disk.
Figure 9:
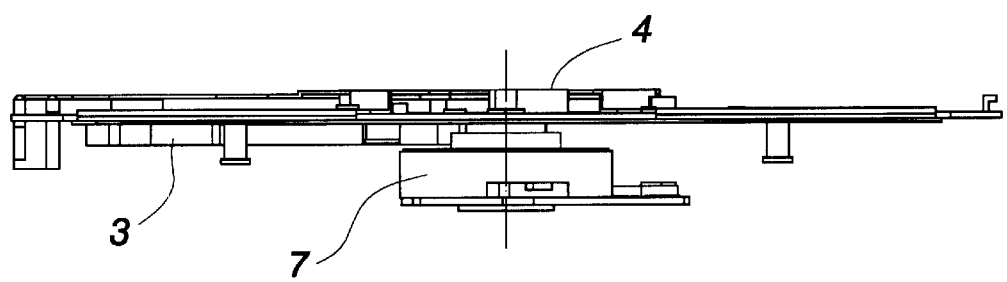
FIG. 9 is a section view of the clamping device of the present invention without clamped disk.
Figure 10:
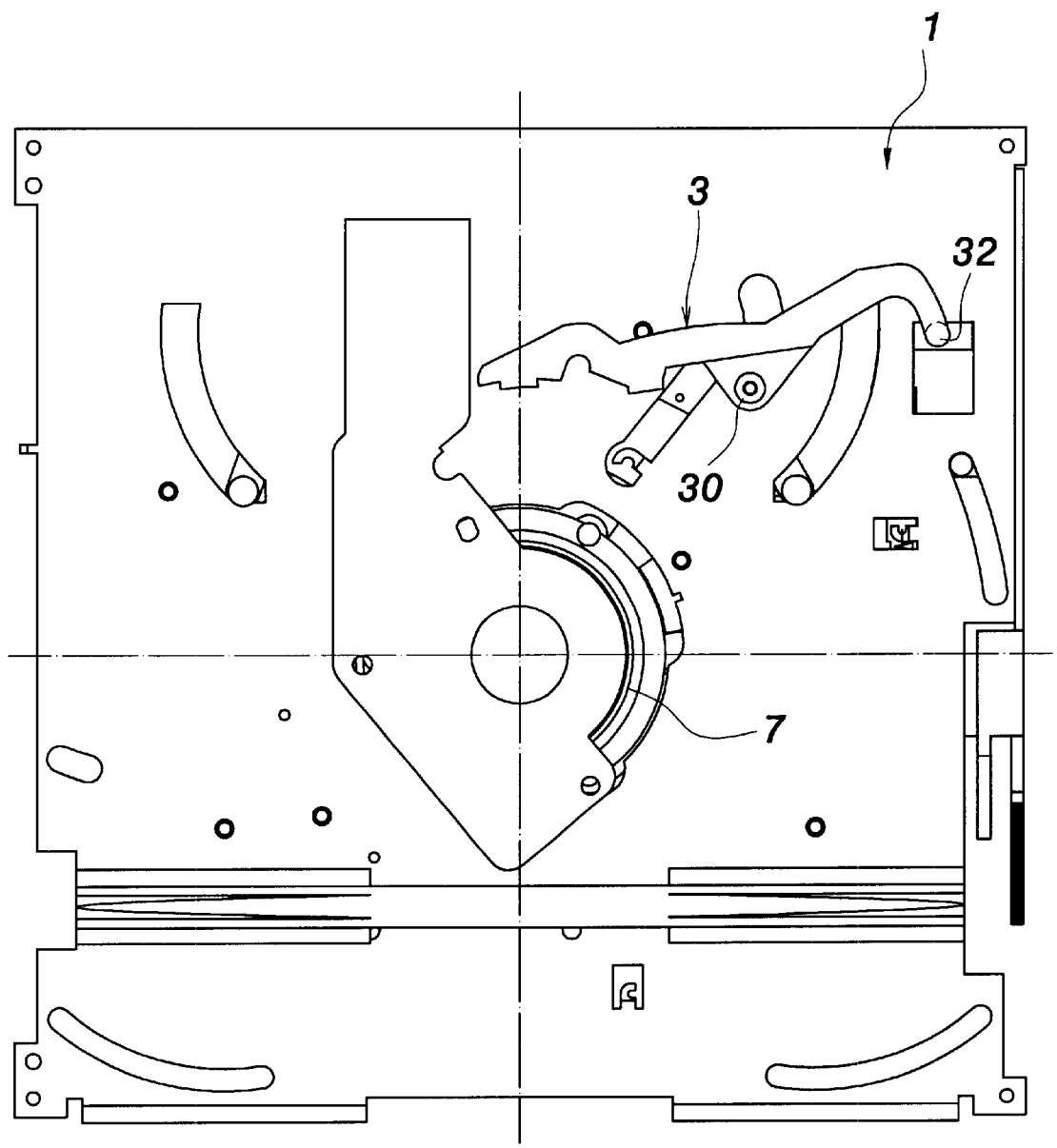
FIG. 10 is a bottom view of the clamping device of the present invention without clamped disk.

Moreover, as shown in FIGS. 8, 9 and 10, the clamping rack 4, the supporting rack 5, and the clamping clinch 6 are assembled to form an upper clamping body. The sliding recesses 40 of the clamping rack 4 is slidably fit with the sliding pin 12 of the base plate 1 such that the clamping rack 4 is confined to have rotation movement only and the supporting rack 5 is linked to rotate in counter clockwise direction.

Moreover, the guiding pin 43 is arranged within the guiding groove 21 of the sliding block 2. When the sliding block 2 is slid in forward direction, the guiding pin 43 is pushed to move in forward direction. The guiding pin 43 simultaneously has transverse shift within the guiding groove 21 of the sliding block 2. At this time, the clamping clinch 6 is rotated in counter clockwise direction and supporting rack 5 is also rotated in counter clockwise direction.

Figure 1:
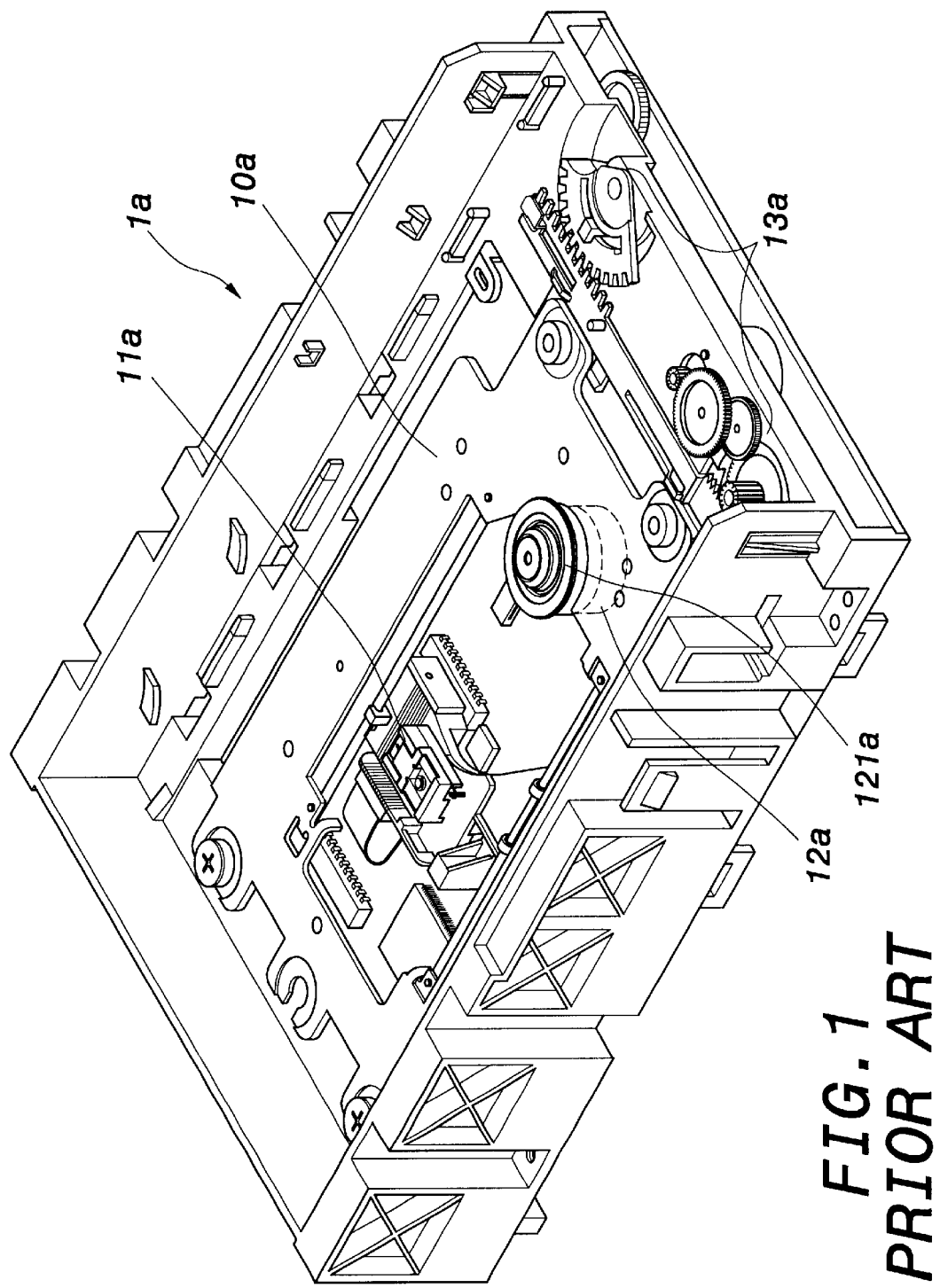
FIG. 1 shows the perspective view of prior art clamping device for optical disk driver.

As shown in FIG. 1A, the present invention has three sliding stages 8 with Z-shaped groove 80. The Z-shaped groove 80 can be replaced by Z-shaped bevel (not shown). The Z-shaped groove 80 has a retaining hole 81 for the sliding stages 8, the retaining hole 81 is assembled to the sliding holes 11 of the base plate 1 by screw (not shown). The Z-shaped groove 80 is functioned as the rail of the rail pins 52.

Therefore, when the clamping rack 4 is rotated in counter clockwise direction, the rail pins 52 are slid downward within the Z-shaped groove 80. The supporting rack 5 is also moved downward and the clamping clinch 6 is linked to move downward to clamp the optical disk 9 on the turntable 70.

After the assembling of the clamping clinch 6, the optical disk 9 and the turntable 70, the optical disk 9 has synchronous movement with the turntable 70 driven by the spindle motor 7. Therefore, the pick up head (not shown) can correctly read the data on the optical disk 9. To eject the optical disk 9, the sliding block 2 is slid in backward direction and the clamping rack 4 is rotated in clockwise direction. The supporting rack 5 is also rotated in clockwise direction. Te rail pins 52 is slid upward in the Z-shaped groove 80 and supporting rack 5 is also moved upward to lift the clamping clinch 6. Therefore the optical disk 9 can be ejected from the optical disk driver.

To sum up, the present invention provides the assembly of a Z-shaped groove and rail pins such that an upper clamping body is rotated downward to clamp the optical disk. The optical disk has a specific distance with the pick up head while the clamping device has compact size.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A clamping device for an optical disk driver, comprising:
   a base plate having a through hole, and a sliding block and a control rod at predetermined positions;
   an upper clamping body composed of a clamping rack, a supporting rack, and a clamping clinch assembled together, the upper clamping body passing through the through hole and the clamping rack being connected to the sliding block, the supporting rack having a plurality of rail pins on a circumference thereof, the clamping clinch clamping an optical disk on a turntable of the optical disk diver;
   a plurality of sliding stages arranged on the base plate and around the through hole, the sliding stages having a rail corresponding to the rail pins and both ends of the rail having different heights;
   the clamping rack being rotated and the rail pins being moved downward in the rail of the sliding stage to move the clamping clinch downward, thus clamping the optical disk on the turntable.

2. The clamping device for optical disk driver as in claim 1, wherein the base plate has a plurality of sliding holes and sliding pins thereon and near the edge of the through hole; the clamping rack having a plurality of sliding recesses corresponding to the sliding pins; the sliding stage having retaining hole assembled to the sliding holes of the base plate by screw.

3. The clamping device for optical disk driver as in claim 1, wherein the base plate has a left link rod and a right link rod linked to each other; the left link rod has a positioning hole in which the control rod is pivotally inserted.

4. The clamping device for optical disk driver as in claim 1, wherein the base has a guiding hole; the sliding block has an aperture for the control rod; the control rod having a driving arm on one end thereof and a guiding pin on another end thereof; the guiding pin passing through the guiding hole and the aperture.

5. The clamping device for optical disk driver as in claim 1, wherein the base has two guiding pins with predetermined separation and the sliding block has two sliding grooves corresponding to the two guiding pins.

6. The clamping device for optical disk driver as in claim 1, wherein the clamping rack has a plurality of supporting pins; the supporting rack having an inner ring and an outer ring together forming a stair shape; the outer ring having a plurality of guiding-pin holes corresponding to the supporting pin; the clamping clinch having an upper surface and a lower surface with a predetermined separation therebetween; the inner ring placed between the upper surface and the lower surface.

7. The clamping device for optical disk driver as in claim 1, wherein the rail of the sliding stage is a Z-shaped groove or a Z-shaped bevel.

\* \* \* \* \*